United States Patent [19]

Batiuk

[11] Patent Number: 4,776,784
[45] Date of Patent: Oct. 11, 1988

[54] EXTRUDER

[75] Inventor: Martin Batiuk, Grafton, Ohio

[73] Assignee: The B. F. Goodrich Company, Akron, Ohio

[21] Appl. No.: 23,013

[22] Filed: Mar. 6, 1987

[51] Int. Cl.$^4$ .............................................. A01J 17/00
[52] U.S. Cl. ...................................... 425/203; 366/75; 366/88
[58] Field of Search ................................ 425/203–209; 366/75, 79, 88, 89

[56] References Cited

U.S. PATENT DOCUMENTS

| 3,287,477 | 11/1966 | Vesilind | 264/53 |
| 3,445,890 | 5/1969 | Heston et al. | 18/12 |
| 4,380,397 | 4/1983 | Hashizume | 366/77 |
| 4,452,750 | 6/1984 | Handwerk et al. | 264/40.3 |

FOREIGN PATENT DOCUMENTS

| 1272132 | 9/1963 | France | 366/75 |
| 2038452 | 2/1972 | Fed. Rep. of Germany | 425/203 |
| 3248659 | 7/1984 | Fed. Rep. of Germany | 425/203 |
| 89323 | 5/1985 | Japan | 425/203 |
| 2119271 | 11/1983 | United Kingdom | 366/79 |

*Primary Examiner*—Bernard Nozick
*Attorney, Agent, or Firm*—Joseph Januszkiewicz

[57] ABSTRACT

A mixing apparatus for mixing thermoplastic compounds wherein the mixing body has a pair of parallel chambers with a pair of rotors rotatably journaled therein. Such mixer has at least one bore communicating the parallel chambers with atmosphere to vent gases from the central bore. A rotatable screw is mounted in the bore which upon rotation continuously feeds the mixed thermoplastic material back into the chambers but allows the gases generated to be vented out of such bore.

6 Claims, 5 Drawing Sheets

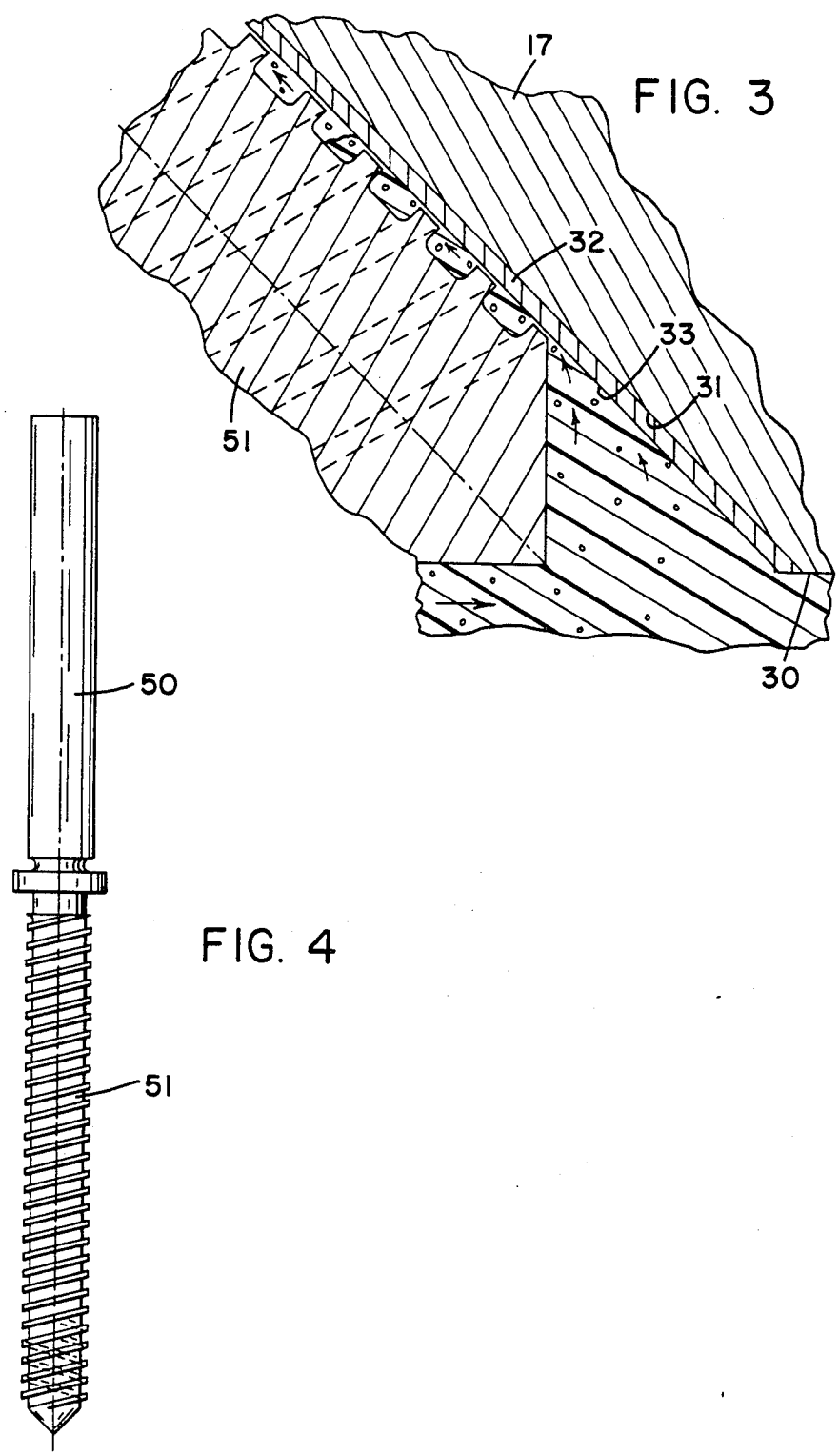

EXTRUDER

BACKGROUND OF THE INVENTION

The present invention relates to a mixer and more particularly to a continuous mixer type that generally has a pair of rotors located adjacent to each other in parallel cylinders that form the mixer barrel.

In the manufacture of thermoplastic materials, the mixer receives the plastic material in its hopper and delivers such materials to a rotor means located in the mixer barrel wherein the rotor means advances, mixes and works the plastic materials to produce a homogeneous mix for general further processing. The art of converting solid thermoplastic materials into a satisfactory mixed and flowing homogeneous melt without overheating or chemical degradation depends in part on the type of thermoplastic material being worked on as well as the type of design of extruder or mixer used. During such mixing operation, it is essential to remove gases to obtain a high quality mix. Cost consideration requires efficient removal of gases otherwise the entrapped gases show up as porosity in the final product such as wire coating and transparent film. Entrapped gases lower the effective output capacity of the mixer by as much as twenty percent. Heretofore, degassing, if available, consisted essentially of mere venting of the mixer housing as by vent holes which became plugged with the material being mixed and advanced in the barrel. The remedy for this situation consisted of drilling the vent holes on a timed basis which could result in damage to the mixing screw or housing. The present invention contemplates the use of a vent hole or a series of holes which house a rotating vent screw. There is sufficient clearance between the vent screw and the vent hole to permit the escape of gases. In addition, the gases are permitted to escape through the screw flight openings.

SUMMARY OF THE INVENTION

The present invention contemplates a mixing apparatus having a pair of mixing screws or rotors or both housed in the main cylindrical barrel which has two adjacent bores that extend in a longitudinal direction and that communicates with a discharge opening. Such cylindrical barrel has a vent hole communicating the interior passageways with the atmosphere A vent screw is journaled in such vent hole and powered to rotate continuously to feed the mixed material back into the central passageways while allowing the venting of gasses through the clearance space provided between the vent screw and its vent hole.

BRIEF DESCRIPTION OF THE DRAWINGS

FIG. 3 is a further enlarged fragmentary cross sectional view of the vent screw and the vent screw housing illustrating the clearance space to de-gas or vent the gas formed in the mixing process;

FIG. 4 is an enlarged side elevational view of the vent screw; and

DETAILED DESCRIPTION

Figure 1:
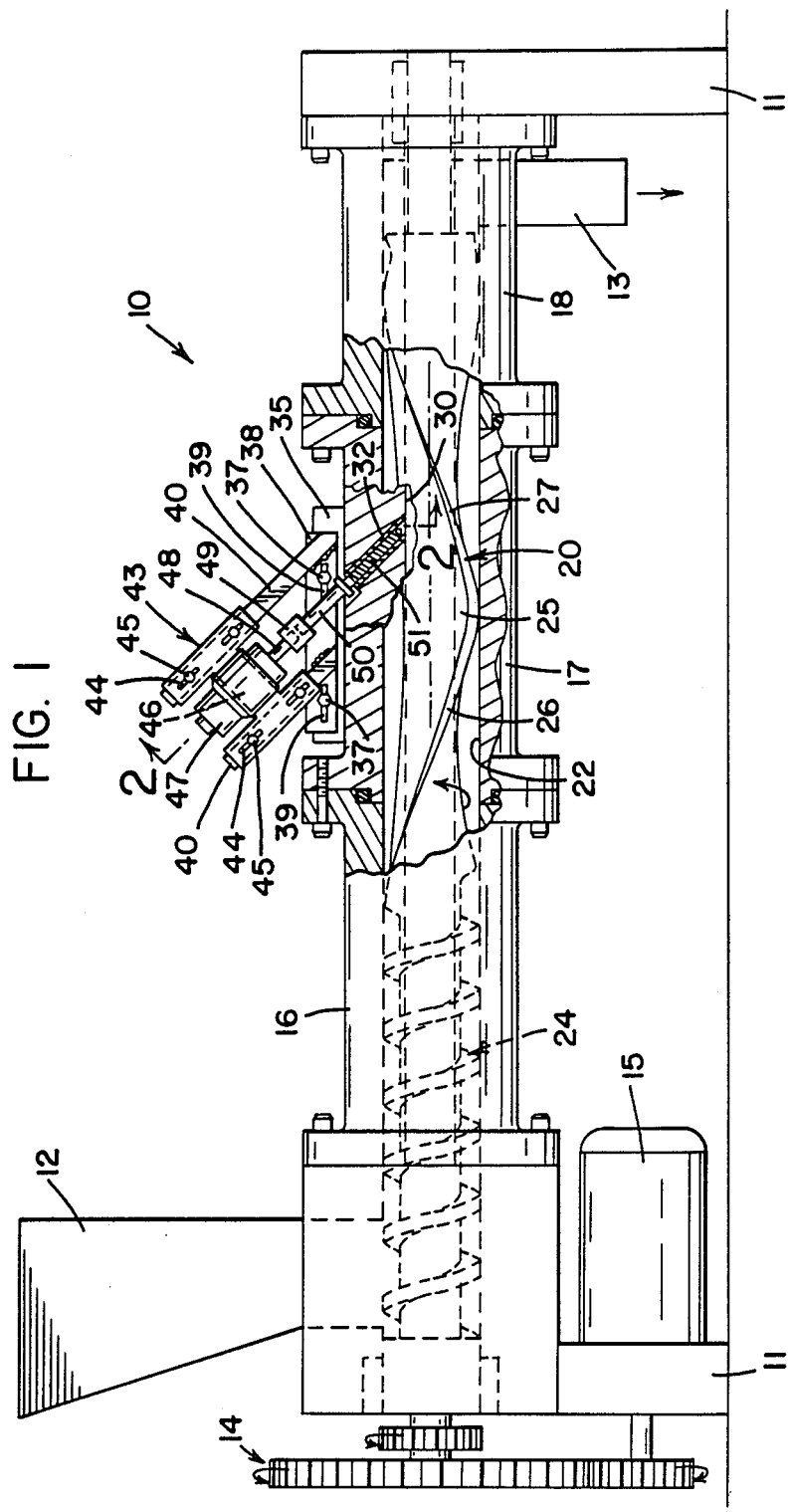
FIG. 1 is a diagrammatic side elevational view of a continuous mixer apparatus with a portion of the cylindrical mixer housing or barrel broken away to disclose a portion of the mixing rotor and the vent screw with its motive rotating means.

Referring to the drawings, wherein like reference characters designate like or corresponding parts throughout the several views, there is shown in FIG. 1 a continuous type of mixer 10 supported by a pair of spaced brackets 11. Mixer 10 has a hopper 12, a discharge opening in die means 13, transmission means 14, drive motor 15 and joined cylindrical housings 16, 17 and 18 in which a pair of rotors 20 and 21 (FIG. 2) are journaled for rotation. The joined cylindrical housings extend in a longitudinal direction and have a pair of adjacent bores 22 and 23 (FIG. 2) that extend from the hopper 12 to the opening in discharge die means 13. In lieu of the joined cylindrical housings 16, 17 and 18, one may have a single longitudinally extending housing. Such bores 22 and 23 communicate with each other along their entire length and may be considered parallel chambers. The rotors 20 and 21 which are journaled in such parallel bore 22 and 23 are driven in rotation from the motor 15 via transmission means 14. Such transmission means 14 rotate the rotors 20 and 21 in opposite directions. Such rotors are provided with lobes 25. The rotors are identical in construction and accordingly only one rotor will be described.

At the hopper end of the mixer 10, rotor 20 has a screw-like section 24 which conveys or feeds material to be mixed from the hopper 12 to the mixing section that contains the lobes 25 which may be considered helices 26. The material is mixed by helices 26 and axially advanced toward the reverse helices 27. Although only one set of helices 26 and 27 are shown, there may be any given number of such sets of helices of varying configurations to provide the desired successive melting and mixing of the material feed from the hopper through the bores 22 and 23. Such mixing by the helices 26 and 27 of the respective rotors 20 and 21 which rotate in opposite directions generates gases and moisture within the material which it is desirable to remove.

Figure 2:
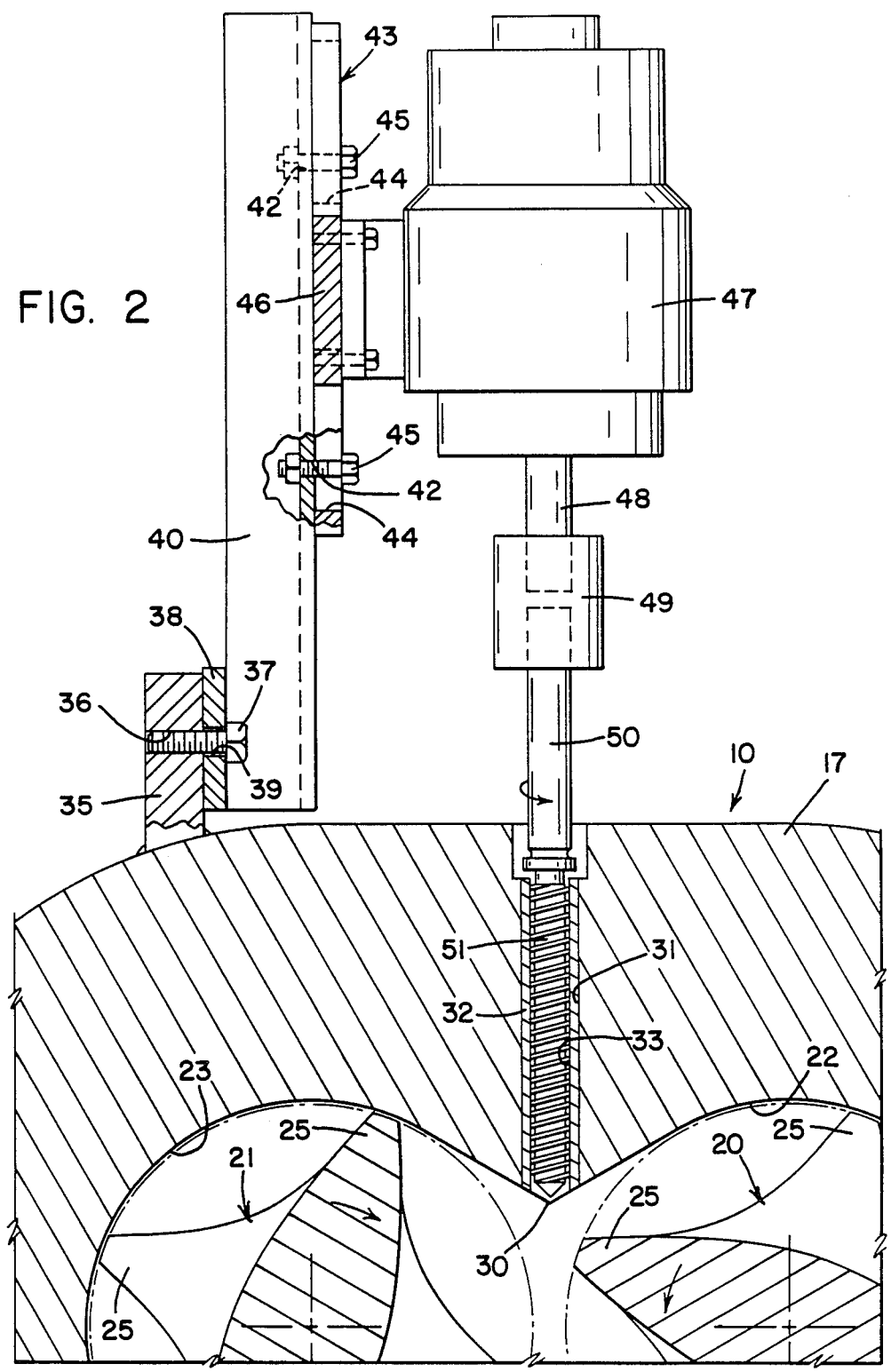
FIG. 2 is an enlarged fragmentary cross sectional view taken on line 2—2 of FIG. 1 of the mixer vent screw located within the mixer barrel and with the motive power means for the vent screw.

As seen in FIG. 2 the intermediate cylindrical housing 17 have their parallel chambers or bores 22 and 23 form an apex 30 along their upper juncture A bore 31 in the upper portion of housing 17 intersects the apex 30 and communicates the chambers or bores 22 and 23 with atmosphere. The axis of bore 31 extends at an acute angle (as seen in FIG. 1) relative to the linear apex 30 when viewed along such apex as extending in a direction toward the hopper 12. A sleeve 3 with a central bore 33 is press fitted into such bore 31 and defines a vent opening to atmosphere from such chambers. The axis of bore 33 makes an acute angle with the upstream longitudinal linear line of the apex 30 and an obtuse angle with the downstream linear line of the apex 30. The linear apex 30 is parallel to the longitudinal center line of bores 22 and 23 and when upstream or downstream direction of the apex 30 is used, the basis is made to the upstream or downstream flow of material through bores 22 and 23. Such reference is made since bore 33 does not intersect the axis of bores 22 and 23 but intersects the horizontal plane that passes through the axis of such bores.

As seen in FIGS. 1 and 2, a bracket 35 is suitably secured to the upper portion of cylindrical housing 17. Bracket 35 has a pair of threaded bores 36 receiving bolts 37. A bracket 38 having a pair of slots 39 aligned with spaced bores 36 and receiving bolts 37 allows the longitudinal alignment and adjustment of such bracket 38 relative to bracket 35.

A pair of spaced frame members or brackets 40 are welded to bracket 38 such that frame members or brackets 40 are parallel to the longitudinal axis of bores 31 and 33. Each frame member 40 is generally U-shaped in configuration having a pair of spaced bores 42. A slide member 43, H-shaped in plan view, has four slots 44. Such slide member 43 is slidably mounted on frame members 40 such, that bolts 45 extending through such slots 44 and through bores 42 permits longitudinal adjustment thereof. The slide member 43 has a cross brace 46 (part of the H-shaped slide member) which has a variable speed motor 47 suitably mounted thereon. The output shaft 48 of motor 47 is suitably connected via a coupling 49 to an output shaft 50 which in turn is connected to a feed or vent screw 51 which is journaled for rotation in sleeve 32. Feed or vent screw 51 is a double flighted helical screw which as shown in FIG. 3 has a slight clearance with the internal diameter of sleeve 32. Although there has been described but one vent bore or opening to atmosphere, there may be provided a plurality of such vent openings 32 with corresponding vent screws 51 to perform the function of venting gases to atmosphere while returning the extrudate mix back into the central chambers or bores 22 and 23 for further mixing.

In the operation of the above described extruder, the PVC material being processed by the mixer moves through the central chambers or bores 22 and 23 of the mixer barrel and is fed by the twin rotors 20 and 21 towards the discharge outlet in the die means 13. As the material is so moved, it is worked and heated whereby the solid PVC is dispersed, melted and mixed for dumping through the discharge opening. During such working action of the PVC material by the twin rotors 20 and 21, there is significant heating up of the PVC materials due to the shearing forces produced by the rotating twin rotors 20 and 21 which melts the particulate PVC or plastic materials which thereby releases volatile gases and moisture within the chambers or bores 22 and 23. Such gases escape through the pre-set clearance between the rotating vent screw 51 and the bore 33 that communicates the central chambers with atmosphere. The mixed melt is kept within the central twin chambers by the rotation of the screw 51 powered by the motor 47 which feeds the mixed material or melt that tries to exit via bore 33 back into the central chamber or bores 22 and 23 for movement via the flights of the rotors towards the discharge openings. With the gases thus removed during the mixing/compounding operation, the quality of the finished product is materially improved in an efficient and cost effective manner. It must be remembered that the entrapped gases lower output as they reduce effective internal volume capacity which lower apparent viscosity of the product thus lowering pumping capacity. Such lowering of capacity can be up to twenty percent of output capacity.

Figure 5:
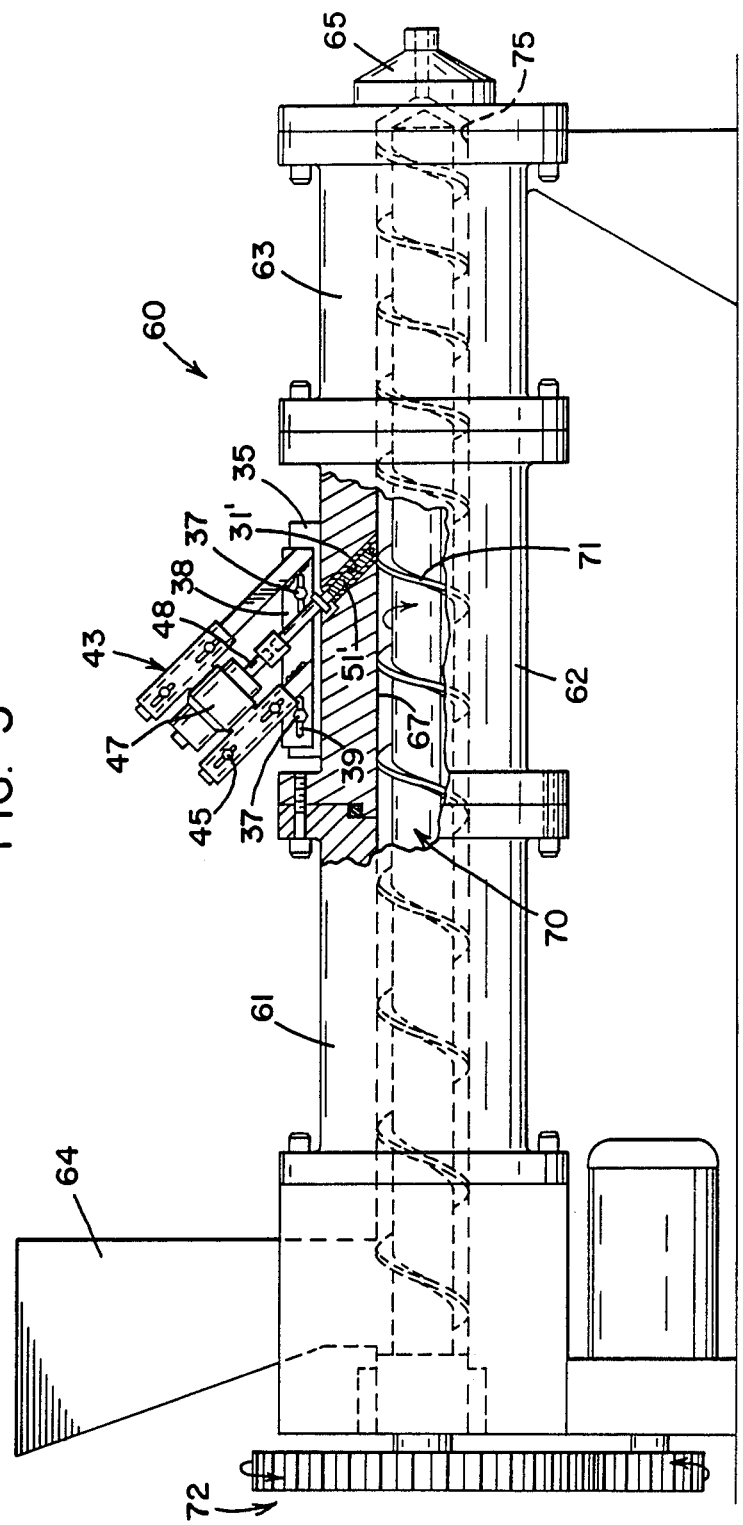
FIG. 5 is a diagrammatic side elevational view of a modification of the invention as applied to an extruder apparatus and FIG. 6 is a diagrammatic side elevational view of a further modification of the invention as illustrated in FIG. 5 but showing a plurality of vents and vent screws.

Although the invention has been described with respect to a continuous type mixer, such principle may be applied to a conventional extruder as depicted by FIG. 5. There is shown in FIG. 5, an extruder 60 having as in the first described embodiment a plurality of axially joined housings 61, 62 and 63, although a one-Piece cylindrical housing may be used. Extruder 60 has a hopper 64 at one end and a discharge die 65 at the other end. The respective axially joined housings 61, 62 and 63 have a central bore 67 that extends for the full length of such extruder, joining the hopper 64 with the die means 65. Journaled for rotation in the central bore 67 of extruder 60 is a feed screw 70 with a single flight 71 for the entire length thereof however terminating adjacent to the die means 65.

Other types of extruder screws may be used, however, the single flighted screw is shown as one example only. The extruder screw 70 is shown as driven by the transmission means 72 with its tip situated downstream of an outlet 75 which outlet 75 is connected to the die means 65. The core of the screw 70 may have flights of varying pitch and varying depth.

In the described embodiment of FIG. 5 the intermediate cylindrical housing 62 has a bore 31' similar to the first described embodiment which communicates the central bore 67 of extruder 60 with atmosphere. The axis of bore 31' makes an obtuse angle with the downstream longitudinal axis of central bore 67 and an acute angle with the upstream longitudinal axis of central bore 67.

As in the first embodiment such bore 31' receives a sleeve that is press fitted therein. Also as in the first described embodiment a power driven screw 51' is journaled for rotation in such bore 31' and operates in the same manner as the first described embodiment. The support structure, motor drive means and brackets for the second embodiment of FIG. 5 is identical to the first embodiment and will not be described in detail since its structure is identical and it operates in the same manner.

Figure 6:
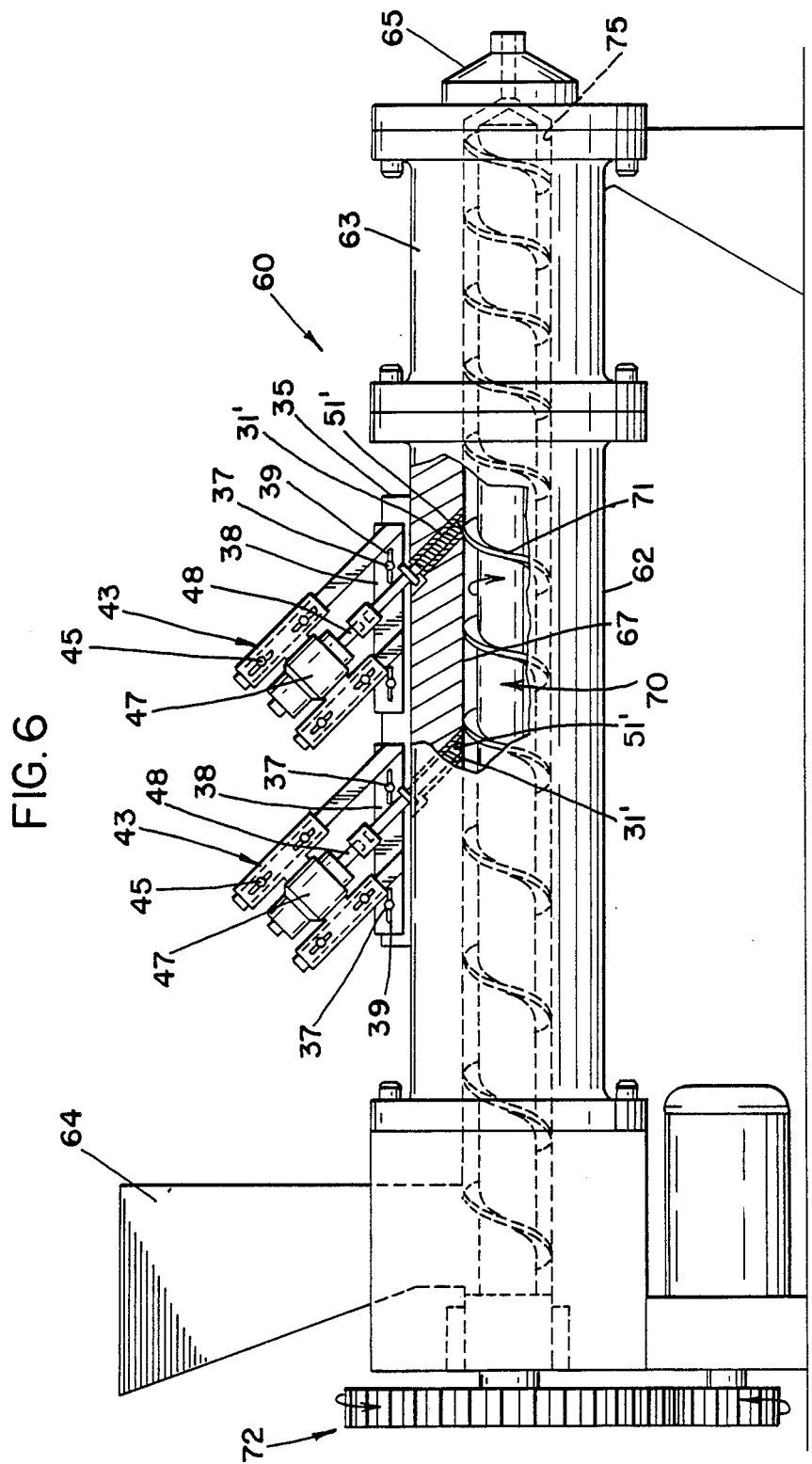

In the operation of the embodiment of FIG. 5, the material being processed by the extruder moves through the central bore 67 of the extruder barrel and is fed by the helical flights 71 of extruder screw 70 towards the outlet 75 of the extruder. As the material is so moved, it is worked and heated whereby the material is dispersed and melted into a homogeneous mix by the time it reaches the die means 65. During such working action of the material in the extruder barrel, there is significant heating up of the materials due to the shearing forces produced by the rotating screw which melts the particulate or thermoplastic materials which thereby releases volatile gases within the barrel. Such gases escape through the preset clearance between the rotating vent screw 51' and its bores as in the first described embodiment thereby communicating the central extruder bore with atmosphere. The mixed extrudate is kept within the central bore 67 by the rotation of the screw 51' which feeds the extrudate that tries to exit via bore 31' from the central bore 67 such that the processed material is fed evenly via flights 71 for discharge through the die means 65. With the gases thus removed during the compounding operation, the quality of the finished product is materially improved in a very efficient manner. It must be remembered that the entrapped gases lower output as they reduce effective internal volume capacity which lower apparent viscosity of the product thus lowering pumping capacity. Such lowering of capacity can be up to twenty percent of output capacity. FIG. 6 illustrates a further embodiment consistent with the specification above, wherein there may be provided a plurality of vent openings with corresponding vent screws to perform the function of venting gaases to atmosphere. FIG. 6 illustrates this feature in a conventional extruder substantially identical to the described in FIG. 6 wherein like reference numerals refer to like parts except that FIG. 6 discloses but two axially joined housing 62 and 63 and further that the one housing 62 has two bores 31' rather than one bore 31' which communicate the central bore 67 with atmosphere and with each bore 31' having jounaled therein for rotation a power driven screw 51'.

The operation of the embodiment of FIG. 6 is identical as that described with respect to FIG. 5.

Various modifications are contemplated and may obviously be resorted to by those skilled in the art without departing from the described embodiments, as hereinafter defined by the appended claims, as only preferred embodiments thereof have been disclosed.

I claim:

1. A mixing apparatus comprising a body having an inlet opening at one end, said body having a pair of parallel longitudinally extending cylindrical lchambers having adjacent portions communicating with each other, an outlet opening at the other end of said body for discharging material mixed in said chambers, said body having an exterior surface that cooperates with said chambers to define a wall along the entire length from said inlet opening at one end to the outlet opening at the other end of said body, rotors mounted for rotation in said chambers, each rotor having a feed screw with flights defining a feed section communicating with said inlet opening, each rotor having a compression lobe section including compression lobes downstream from said feed section for mixing and shearing action on such material, a bore extending through said wall of said body radially outwardly of the lobes communicating said chambers that journals said compression lobe section with atmosphere, and a flighted screw journaled in said bore for rotation to maintain materials passing through said chambers in said chambers while venting gases from said chamber to atmosphere along the flights of said screw.

2. A mixiing apparatus as set forth in claim 1 wherein the intersection of said parallel cylindrical chambers that communicate with each other define at least one linear apex, the axis of said bore that extends through said wall of said body that communicates with said chambers intersects said linear apex, and said axis of said bore makes an obtuse angle with the downstream portion of said linear apex.

3. A mixing apparatus as set forth in claim 2 wherein said flights of said screw journaled in said bore has very shallow flights providing a minimum clearance between the outermost surface of said flights of said screw and the outermost wall of said bore to permit the escape of gases from said chambers.

4. In an apparatus for advancing and working thermoplastic materials comprising a cylinder with an exterior surface; said cylinder having a central bore extending longitudinally therethrough with die means at one end thereof; said cylinder defines a wall between said exterior surface of said cylinder and said central bore along the full length of said cylinder, a feed screw rotatably journaled in said central bore of said cylinder; said feed screw having compressive helical flights along the full length of said feed screw that are operative to provide a continuous compressive action on said material passing through said central bore; said helical flights extend along the full length of said feed screw from said one end to the other end thereof; said cylinder having a passageway extending through said wall communicating said central bore with atmosphere; said passagaeway located in said cylinder that houses said feed screw providing said compressive action; a rotatable vent screw with shallow flights journaled in said passageway for maintaining worked thermoplastic materials in said central bore while venting gases from said central bore.

5. In an apparatus for advancing and working thermoplastic materials as set forth in claim 4 wherein said central bore having a longitudinal axis extending from said one end of said central bore to the other end of said central bore, said other end being the upstream end of said central bore, and said passageway's axis makes an acute angle with said longitudinal axis of that portion that lies toward said other end of said central bore.

6. In an extrusion apparatus for advancing and working thermoplastic material consisting of an extruder barrel, said barrel having central bore means extending longitudinally therethrough, said extruder barrel cooperative with said central bore means to define a wall along the full length of said barrel, a hopper on one end of said barrel communicating with said central bore, a die means on the other end of said barrel, feed screw means rotatably journaled in said central bore means, said feed screw having compressive flights for working and advancing thermoplastic material through said central bore means operative to provide a continuous compressive action on said material passing through said central bore means, said helical flights defining a compression stage therein, a plurality of spaced vent openings extending through said wall located along the length of said barrel wherein said spaced vents communicate said central bore means with atmosphere, each of said spaced vent openings having a vent screw with shallow flights rotatably journaled therein, and motive drive means connected to said vent screws for rotating said vent screws for advancing worked thermoplastic material back into said central bore means.

* * * * *